United States Patent

Sakow

[11] Patent Number: 5,346,399
[45] Date of Patent: Sep. 13, 1994

[54] EDUCATIONAL GAME FOR CHILDREN

[76] Inventor: Toshihiko Sakow, 82 Copley Ave., Teaneck, N.J. 07666

[21] Appl. No.: 153,093

[22] Filed: Nov. 17, 1993

[51] Int. Cl.⁵ .............................................. G09B 1/00
[52] U.S. Cl. .................................... 434/201; 434/159; 434/171; 434/188; 434/200
[58] Field of Search ............... 434/201, 188, 200, 322, 434/327, 334, 159–161, 191, 193, 195, 196, 202, 204, 208, 209, 236, 322, 327, 333, 340, 343, 345, 171, 172; 446/379; 364/410–412

[56] References Cited

U.S. PATENT DOCUMENTS

| | | | |
|---|---|---|---|
| 3,958,344 | 5/1976 | Lesiak | 434/201 X |
| 4,936,780 | 6/1990 | Cogliano | 434/159 X |
| 4,968,255 | 11/1990 | Lee et al. | 434/159 |

Primary Examiner—Richard J. Apley
Assistant Examiner—Glenn E. Richman
Attorney, Agent, or Firm—Howard C. Miskin

[57] ABSTRACT

An educational apparatus includes a housing having a front wall with laterally spaced arrays of sensing and positioning holes and sets of letter or number display members each including one or more positioning pins and one or a pair of differently spaced and located positioning pins projecting from the rear faces of the display members, the pins being slidably engageable with respective holes. A switch matrix is located behind each hole array and is connected to the input of a calculator or message enunciating network located in the housing and having an output connected to LCD's on the housing front wall and/or to a transducer speaker in the housing. Calculator function switch buttons are located on the front wall.

6 Claims, 4 Drawing Sheets

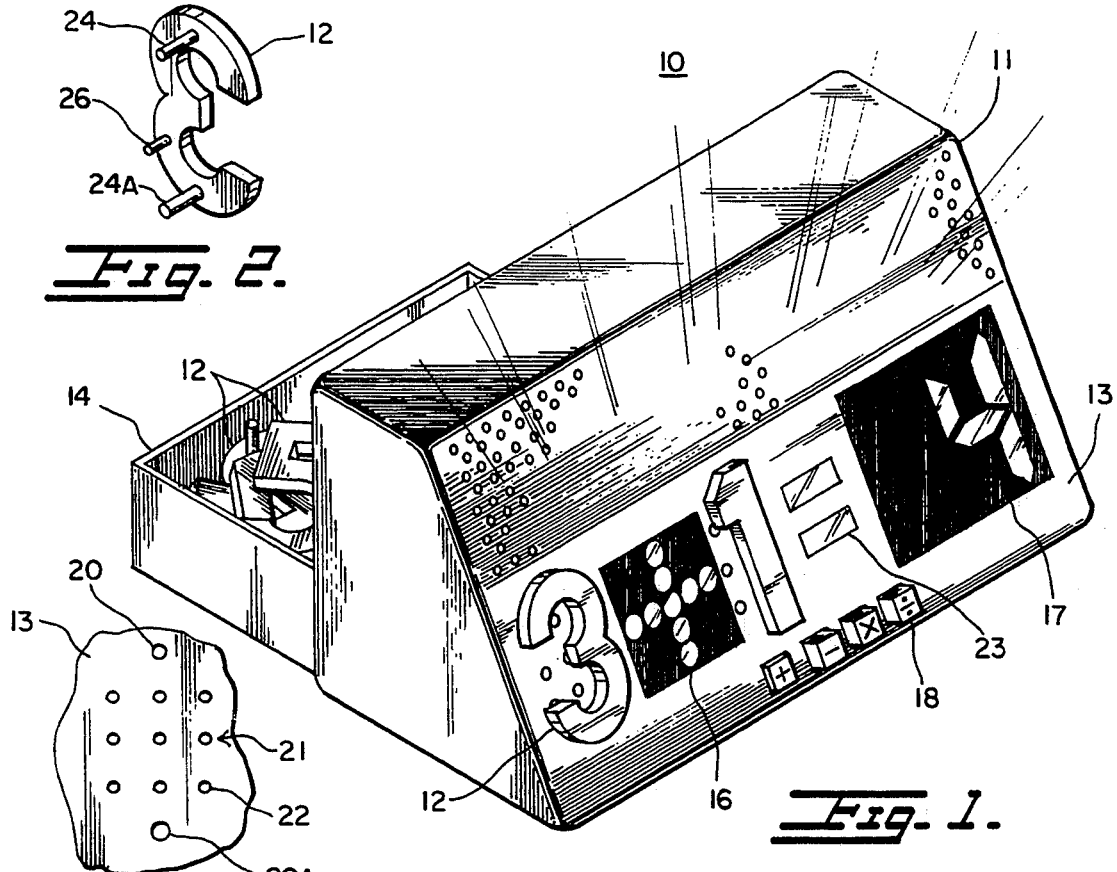
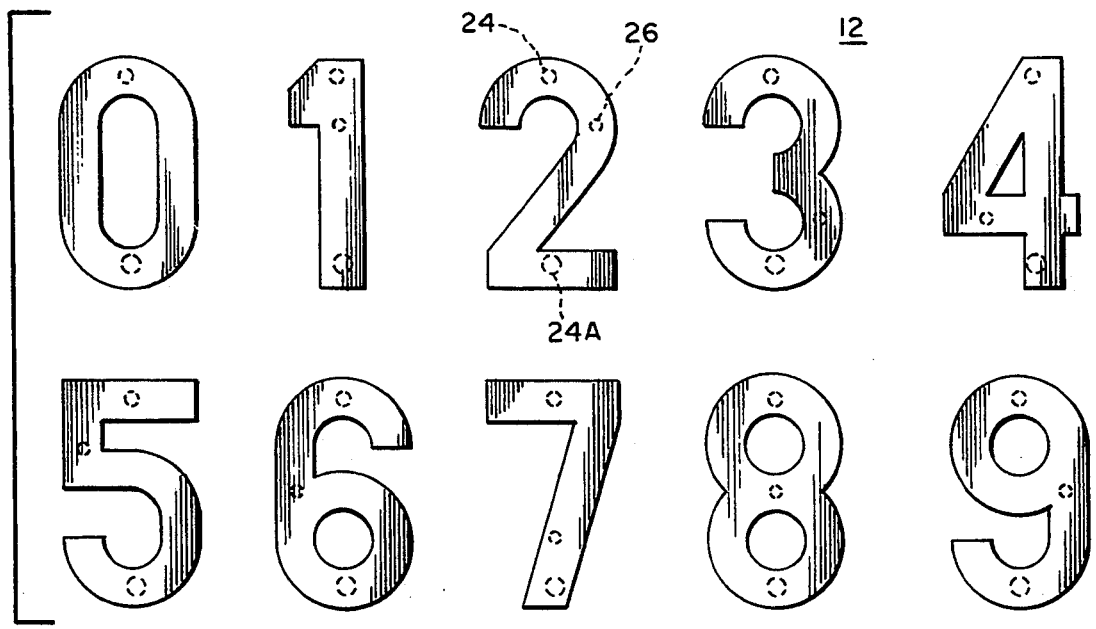

5,346,399

EDUCATIONAL GAME FOR CHILDREN

BACKGROUND OF THE INVENTION

The present invention relates generally to improvements in educational devices and it relates particularly to an improved apparatus for the teaching of spelling and simple arithmetic to preschool children.

The teaching of simple arithmetic and spelling to the very young, such as addition, multiplication, division and subtraction, and the spelling of single syllable words by mechanical devices requires a device which is simple to operate and holds the attention of the child while instructing the child by way of participation and examples. Moreover, the device must be rugged and attractive to the child and encourage its involvement. While many apparatus and devices with this object have been employed and proposed, they do not satisfy many of the above requirements and otherwise leave much to be desired.

SUMMARY OF THE INVENTION

It is a principal object of the present invention to provide an improved educational apparatus.

Another object of the present invention is to provide an improved educational apparatus for use and operation by children.

Still another object of the present invention is to provide an improved apparatus for teaching arithmetic, or spelling to preschool children.

A further object of the present invention is to provide an improved teaching apparatus which is highly effective when employed by children and strongly holds their attention and encourages their involvement.

A further object of the present invention is to provide an apparatus of the above nature which is of highly attractive appearance, rugged, simple and convenient to operate by children and is of great versatility and adaptability.

The above and other objects of the present invention will become apparent from a reading of the following description taken in conjunction which the accompanying drawings which illustrate preferred embodiments thereof.

An educational apparatus in accordance with the present invention includes a mounting panel having a plurality of positioning openings, a plurality of alphanumeric display members having projections on their rear faces releasably slidably engageable with the positioning openings to effect the releasable coupling of the display members to predetermined positions on the mounting panel, each of the display members having an actuating pin on in its rear face in a position according to the identity of the respective display member and the panel having an array of holes each of which is receptive to a correspondingly positioned actuating pin, a calculator processing network including an input switch array registering with each array of the hole matrix, function switches and an output responsive to the actuated switches and a sensible output display member responsive to the calculator network output. The output display may be an LCD display and/or an audible enunciator coupled to the calculator network through a converter producing an audio message signal in response to the calculator network output.

Advantageously, the mounting panel constitutes the front wall of casing which includes a drawer which removably holds the display members. While the display members may be in the shapes of respective numbers or letters, there may be other shapes carrying pictures of respective numbers or letters.

The improved apparatus is simple, rugged, and highly attractive, may employ conventional electrical components, is highly effective in the teaching and holding the attention of young children, and is of great versatility and adaptability.

BRIEF DESCRIPTION OF THE DRAWINGS

FIG. 1 is a front perspective view of a preferred embodiment of the present invention shown in operation in a draw retractive position;

FIG. 2 is a rear perspective view of a numeral display member employed by the improved apparatus;

FIG. 3 is a fragmented front elevational view of the apparatus front support wall;

FIG. 4 is a front elevational view of the numeral display members;

DESCRIPTION OF THE PREFERRED EMBODIMENTS

Figure 5:
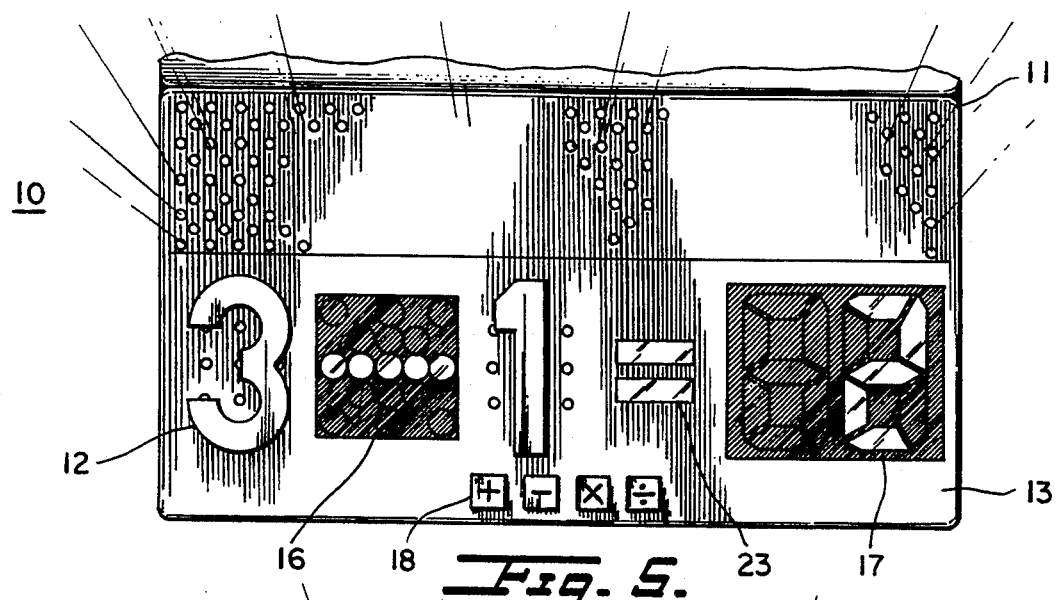
FIGS. 5 to 7 are front elevational views of the improved apparatus illustrating the application of subtraction, multiplication and division arithmetic function.
Figure 6:
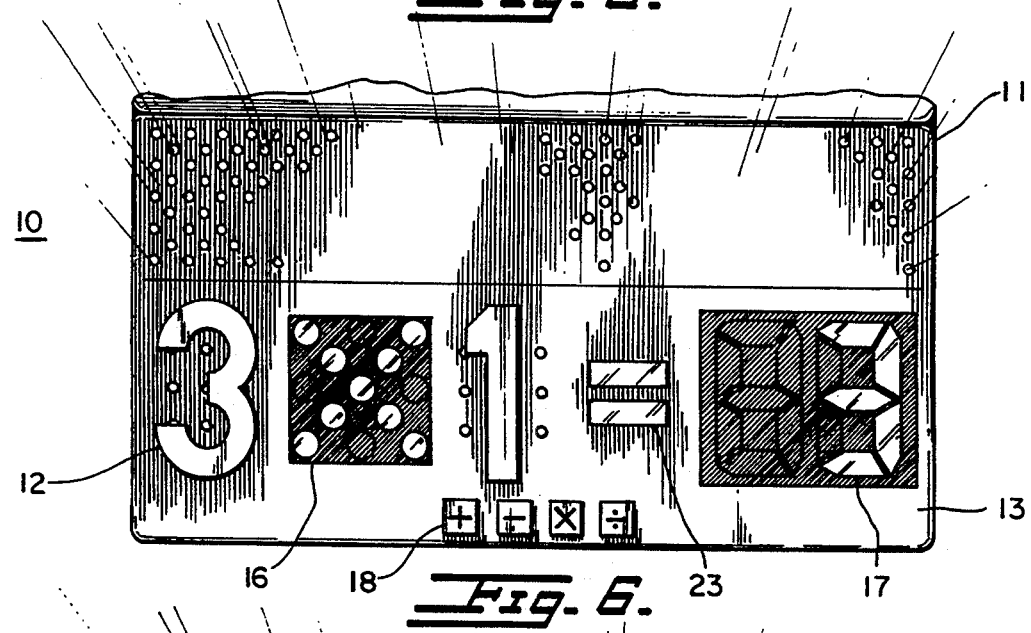
Figure 7:
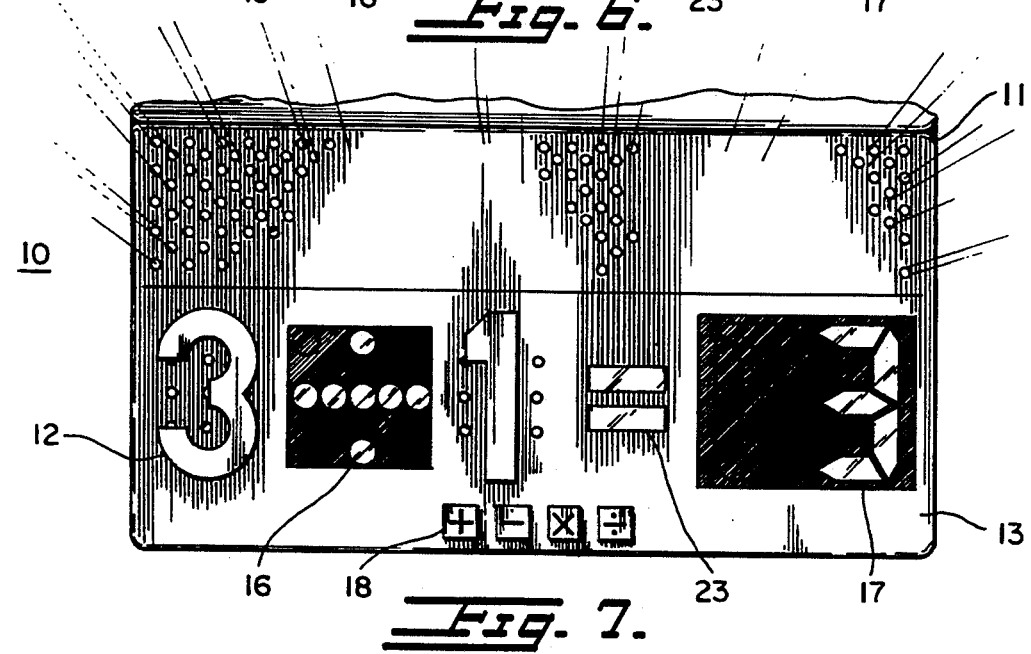

Referring now to the drawings, particularly FIGS. 1 to 7 and 10 thereof which illustrate a preferred embodiment of the present invention, the reference numeral 10 generally designates the improved educational apparatus which comprises a housing 11 and a plurality of numeric display members 12 including the numbers 0 to 9.

The housing 11 includes a support member defining upwardly rearwardly inclined rectangular front wall or panel 13, side, top, bottom and rear walls, the rear wall having a laterally extending bottom rectangular opening which is slidably engaged by an open topped drawer 14 resting on the housing bottom wall. The display members 12 are removably carried in the drawer 14.

A first LCD display 16 is located on the left half of panel 13 and a second larger LCD display 17 is located on panel 13 proximate the right edge of the panel and spaced from first panel 16. Medially positioned along the bottom edge of panel 13 are laterally spaced depressible switch actuating arithmetical +, −, ×, ÷ buttons 18. A pattern of holes is formed in panel 13 on opposite sides of LCD 16, each pattern including a pair of vertically spaced positioning relatively large holes 20, 20A and a 3×3 square array 21 of small holes 22. Holes 20 and 20A differ in size from each other to assure proper orientation of display members 12 by a learning child. Located on the front face of panel 13 between LCD's 16 and 17 and proximate LCD 17 is an equal sign 23.

Each display member 12, although illustrated as being in the shape of a respective numeral may be of other configurations and otherwise identified. Located in the rear face of each numeral is a pair of rearwardly projecting positioning and coupling pins 24, 24A vertically spaced a distance equal to the distance between locating holes 20, 20A and slidably engageable with holes 20, 20A. Also projecting rearwardly from each display member 12 is an actuating pin 26 shorter than and of lesser diameter than that of pins 24, 24A, pin 26 being differently located on display members 12 in accordance with the identity of the different display members 12 and registering with a respectively different hole 22 of array 21 and slidably engaging the respective hole 22 when the display member 12 is coupled to panel 13 by the separable engagement of pins 24, 24A with holes 20, 20A. Pins 26 are shorter than pins 24 and 24A.

Mounted in the rear face of panel 13 in registry with respective hole arrays 21 is a multiple switch matrix 27 having an array switch actuating areas 28, each area 28 being in registry with a respective hole 22 of an array 21. A calculator module or network 29 of well known construction has its input terminals connected to respective switches of matrices 27 and has separate outputs connected in the known manner to respective LCD's 16 and 17. The function buttons 18 actuate respective switches 32 of a switch matrix also connected to respective inputs of calculator module 29. Further, the output of calculator module 29 is connected to the input of a converter network or module 33 of known construction whose output is a number audio signal connected to the input of an electrical to audio transducer 34 located within housing 11.

In the operation of the improved educational apparatus 10 described above the operator couples a number display member in the first position to effect the closure of a respective switch element of the respective switch matrix 27 by an actuating pin 26. The operator then depresses a selected button 18 to close a corresponding switch 32 and then couples a number display member 12 to panel 12 in the second position to close a respective matrix switch. The calculator module then processes the number inputs and inputted mathematical function to produce an output which actuates LCD 17 to display the result of the mathematical operation on the panel mounted display members 12 and the input mathematical function is displayed on LCD 16 as activated by the output of calculator processor 29. Moreover, the mathematical result is audibly announced by transducer 34 motivated by the output of converter 33 actuated by the output of processor 29.

Figure 8:
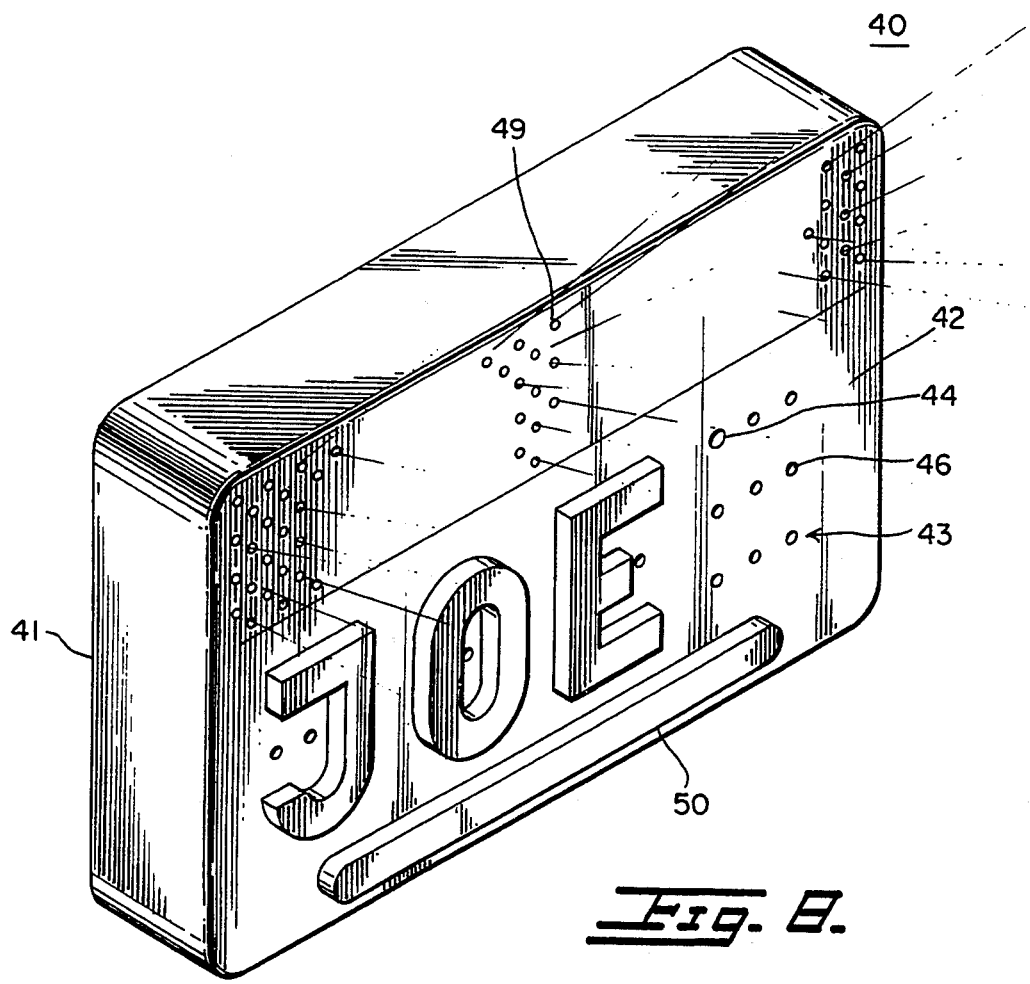
FIG. 8 is a front perspective view of another embodiment of the present invention.
Figure 9:
FIG. 9 is a front elevational view of the alphabetic display members employed with the improved apparatus.
Figure 10:
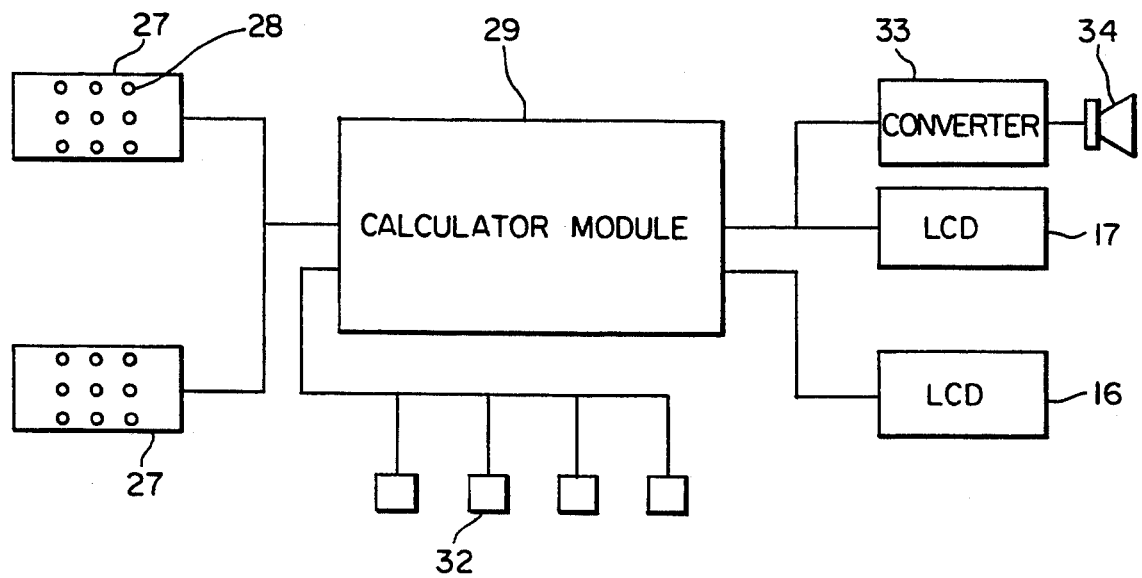
FIG. 10 is a block diagram of the electrical network forming part of the improved apparatus.

Another embodiment of the present invention is illustrated in FIGS. 8 and 9 of drawing and differs in application from that described above primarily in that it employs alphabetic display members and audibly enunciates the word formed by the applied display members. Specifically, the improved educational apparatus is designated by the reference numeral 40 and includes a housing or case 41 having a front wall or panel 42 and a plurality of alphabetic display members 45. As in the first embodiment, display members 45 may be alphabet shaped or otherwise shaped with suitable letter identification.

Laterally spaced square 3×3 arrays 43 of opening s are formed in panel 42, each 43 including in its upper corner a relatively large locating opening 44, the remaining holes 46 of each array being of lesser diameter than hole 44. A switch actuating bar 50 is located along the lower border of case 41.

Each display member 45 has formed on its rear face proximate its upper left corner a rearwardly projecting positioning coupling pin 48 slidably engageable with any respective locating hole 44. Also projecting from the rear face of each display member 45 is a pair of switch actuating pins 47 whose positions and spacing is in accordance with the identity of the respective display member 45 and differs from display member to display member. The actuating pins 47 are slidably engageable with respective array holes 46.

The upper border of case 51 is perforated as at 49 and a speaker electrical to audible signal transducer is housed in case 41 in registry with the perforated area 49. Also located in case 41 is a switch matrix behind each array of holes 46, each switch matrix having a switch activating element registering with each array hole 46. Additionally housed in case 41 is a processing network of the nature of that shown in FIG. 10 but without the calculator module and being of known construction including a processing converter like that of processing converter 33. Each of the switch matrices are connected to corresponding input terminals of the converter processor whose output is connected to the earlier explained transducer. The processing network is energized by a battery replaceably housed in case 51 and connected to the network through a normally open switch closed by depression of switch actuating bar 50.

In the operation of educational apparatus 40 selected display members 45 are coupled to panel 41 by slidably engaging positioning pins 48 with respective holes 44 with corresponding pairs of actuating pins 47 projecting through respective holes 46 to close corresponding pairs of matrix switches aligned with holes 46. The bar 50 is then depressed to energize the processing network to produce an audio output signal determined by the combination of closed matrix switch which is transduced by the speaker which enunciates the word spelled by the applied display members 45, if such word exists and coded and stored in the network.

While there have been described and illustrated preferred embodiments of the present invention it is apparent that numerous alterations, additions and omissions may be made without departing from the spirit thereof.

I claim:

1. An educational apparatus comprising a support member, a plurality of alphanumeric display members including an actuator located on each of said display members at a position in accordance with the identity of the respective display member, means for releasably coupling said display members at predetermined respective positions on said support member, and output means responsive to the positions of a plurality of said actuators of respective support member coupled display members for producing an audible signal in accordance with a predetermined relationship of said coupled display members, wherein said output means includes a plurality of switch members located on said support member along the loci of respective support member coupled display member actuator, said display members includes numeral shaped members, a calculator network having an input connected to said switches, an output being selectively actuated for different mathematical function operations and an LCD connected to said output of said calculator network, said sensible signal is an audible message.

2. The apparatus of claim 1 wherein said support member comprises a panel having openings formed therein registering with respective of said switch members and said actuators comprise a pin projecting from a face of each of said display members into sliding engagement with a respective of said openings.

3. The apparatus of claim 2 including selectively actuated function switches located on said panel and connected to said calculator network for selectively activating said network mathematical functions.

4. The apparatus of claim 1 wherein said output means includes a plurality of switch members located on said support member along the loci of respective support member coupled display member actuators, an audible message enunciator network holding inputs connected to respective of said switch members and an analog audio electrical message signal output and an electrical to audio transducer connected to said network output.

5. The apparatus of claim 1 including a housing having a front wall defining said support member and a drawer slidably carried by said housing and removably holding said display members.

6. The apparatus of claim 5 wherein said output means is located in said housing.

* * * * *